US012570531B1

(12) United States Patent
Lawrence et al.

(10) Patent No.: US 12,570,531 B1
(45) Date of Patent: Mar. 10, 2026

(54) METHOD AND SYSTEM FOR MANUFACTURING SILICON NITRIDE FROM WASTE SILICON KERF

(71) Applicant: CRS-SPV INC., Louisville, KY (US)

(72) Inventors: William Lawrence, Louisville, KY (US); Michael Korzenski, Bethel, CT (US); Travis Hendren, Crestwood, KY (US); Tom Earl, Sellersburg, IN (US); Jerry Jernigan, Mt. Wolf, PA (US); Ray Sibley, Dillsburg, PA (US)

(73) Assignee: CRS-SPV Inc., Jeffersonville, IN (US)

( * ) Notice: Subject to any disclaimer, the term of this patent is extended or adjusted under 35 U.S.C. 154(b) by 747 days.

(21) Appl. No.: 17/880,873

(22) Filed: Aug. 4, 2022

Related U.S. Application Data

(60) Provisional application No. 63/230,132, filed on Aug. 6, 2021.

(51) Int. Cl.
*C01B 21/068* (2006.01)

(52) U.S. Cl.
CPC ...... *C01B 21/0682* (2013.01); *C01P 2004/61* (2013.01)

(58) Field of Classification Search
None
See application file for complete search history.

(56) References Cited

U.S. PATENT DOCUMENTS 5,364,608 A * 11/1994 Edler ................. C04B 35/5935
264/647
5,902,542 A 5/1999 Hirao et al.

6,161,533 A 12/2000 Katsumata et al.
6,273,082 B1 8/2001 Tselesin
8,877,078 B2 11/2014 Yu
2013/0001816 A1 1/2013 Yamahara et al.
2013/0319391 A1 12/2013 Hariharan et al.
(Continued)

FOREIGN PATENT DOCUMENTS

CN 101224879 A * 7/2008
CN 102849695 A * 1/2013
(Continued)

OTHER PUBLICATIONS

Zhang et al "Preparation of Low-Boron silicon from diamond wire sawing waste by pressure-less sintering and CaO-SiO2 Slag Treatment", ACS Sustainable chemistry and engineering, 8, 2020, 11755-11763 (Year: 2020).*
(Continued)

*Primary Examiner* — Michael Forrest
*Assistant Examiner* — Nicole Lee Quist
(74) *Attorney, Agent, or Firm* — Stites & Harbison, PLLC; David W. Nagle, Jr.; James R. Hayne

(57) ABSTRACT

A method for manufacturing silicon nitride from waste silicon kerf includes the steps of reducing agglomerations in the waste silicon kerf, adding and mixing calcium oxide to the waste silicon kerf, placing the waste silicon kerf in a ceramic crucible, placing the ceramic crucible in a furnace, heat treating the waste silicon kerf in the ceramic crucible in the furnace under a vacuum to disassociate silicon dioxide into silicon and silicon monoxide, and heat treating the waste silicon kerf in the ceramic crucible in the furnace while introducing nitrogen gas into the furnace to create the silicon nitride.

23 Claims, 1 Drawing Sheet

(56) References Cited

U.S. PATENT DOCUMENTS

| | | |
|---|---|---|
| 2016/0348271 A1 | 12/2016 | Ravi et al. |
| 2017/0101319 A1 | 4/2017 | Hariharan et al. |
| 2020/0016671 A1 | 1/2020 | Pietsch |
| 2021/0107799 A1 | 4/2021 | Chu |

FOREIGN PATENT DOCUMENTS

| | | | | |
|---|---|---|---|---|
| CN | 112390663 A | * | 2/2021 | |
| CN | 112456498 A | * | 3/2021 | ............. B82Y 30/00 |
| EP | 0243880 A1 | | 11/1987 | |
| EP | 1351891 B1 | | 9/2004 | |
| JP | S6168310 A | * | 4/1986 | |
| JP | 2011051856 A | | 3/2011 | |
| WO | 2009155506 A2 | | 12/2009 | |
| WO | 2016171018 A1 | | 10/2016 | |
| WO | 2022106675 A1 | | 5/2022 | |

OTHER PUBLICATIONS

Yang et al., "Silicon recycling and iron, nickel removal from diamond wire saw silicon powder waste: Synergistic chlorination with CaO smelting treatment", Minerals Engineering, 169, 2021 (Year: 2021).*

Jin, X., et al., "Recycling of silicon kerf loss derived from diamond-wire saw cutting process to prepare silicon nitride," Journal of Cleaner Production 247 (2020) 119163.

Vazquez-Pufleau, M., et al., "Elimination of Carbon Contamination from Silicon Kerf Using a Furnace Aerosol Reactor Methodology," Ind. Eng. Chem. Res. (2015) DOI: 10.1021/acs.iecr.5b00577.

Yang, H.L., et al., "Recycling and reuse of kerf-loss silicon from diamond wire sawing for photovoltaic industry," Waste Management 84 (2019) 204-210.

Kong, J., et al., "An Economical Approach for the Recycling of High-Purity Silicon from Diamond-Wire Saw Kerf Slurry Waste," (2018) https://doi.org/10.1007/s12633--018-9889.

Wang, T.Y., et al., "A novel approach for recycling of kerf loss silicon from cutting slurry waste for solar cell applications," Journal of Crystal Growth 310 (2008) 3403-3406.

Xiao, Y., et al., "Potential Routes for Recycling and Reuse of Silicon Kerf," Advanced Materials Research vols. 295-297 (2011) 2235-2240.

* cited by examiner

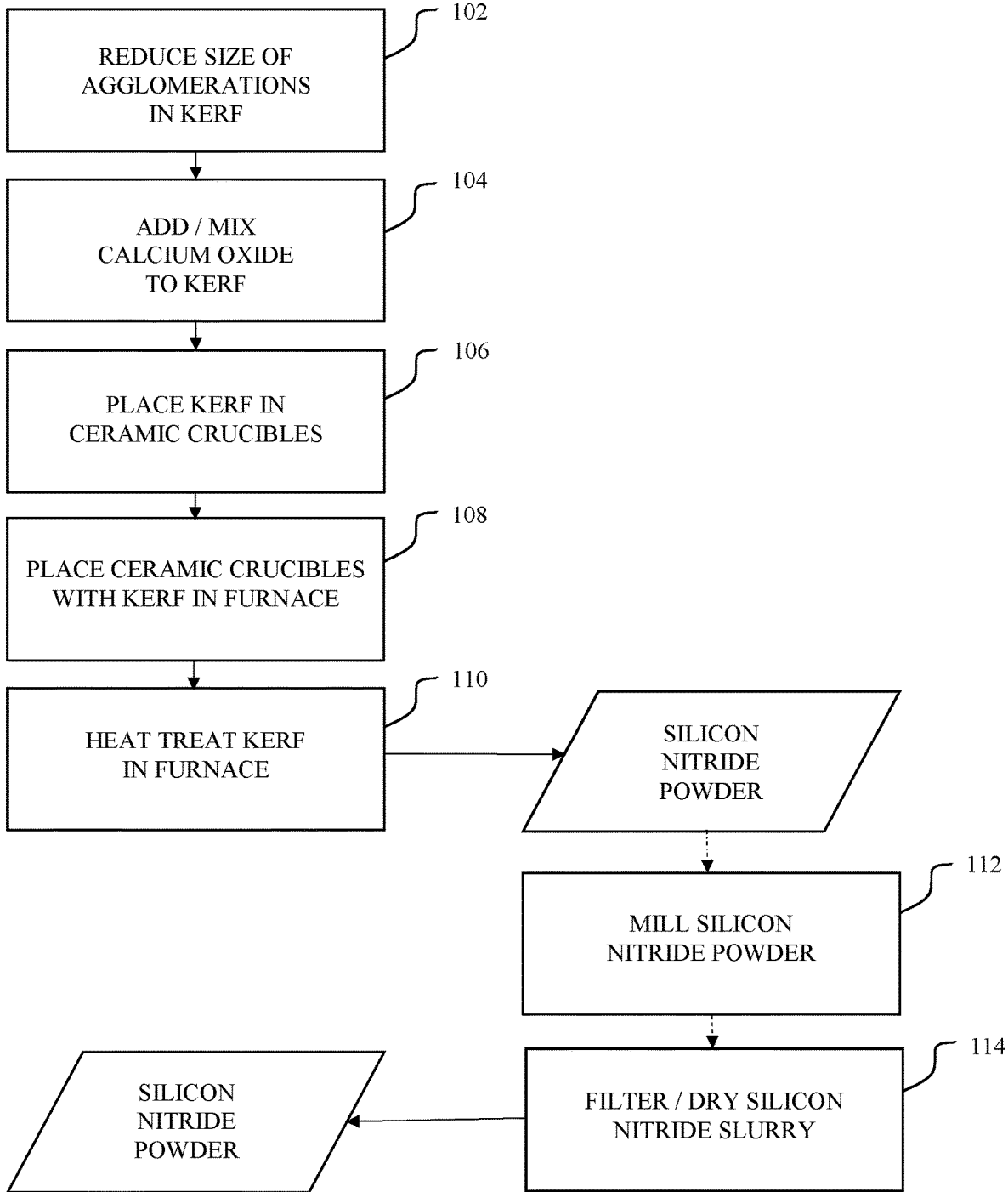

METHOD AND SYSTEM FOR MANUFACTURING SILICON NITRIDE FROM WASTE SILICON KERF

CROSS-REFERENCE TO RELATED APPLICATIONS

The present application claims priority to U.S. Patent Application Ser. No. 63/230,132 filed on Aug. 6, 2021, the entire disclosure of which is incorporated herein by reference.

BACKGROUND OF THE INVENTION

Over 160,000 tons of silicon kerf is created each year in the process of cutting of silicon ingots to create photovoltaic and semi-conductor wafers. Some of this waste kerf is used to make ferrosilicon for the steel industry, but the bulk of the material is sold for concrete/asphalt fillers and pavers.

In recent years, diamond wire has often replaced silicon carbide slurry for cutting silicon ingots. The kerf from diamond wire cutting is contaminated with carbon from the suspension agent (lubricant) added to the carrier water, carbon from the diamond, metals from the diamond wire, silicon dioxide ($SiO_2$), and, of course, water from the carrier. The silicon dioxide contamination occurs when the water carrier reacts with the kerf. The kerf is typically a wet paste when it is removed from the water carrier. Water content can be as high as 40-50%. Even after the kerf arrives at a subsequent manufacturing or processing location, the kerf still typically has a water content of 2-30%.

SUMMARY OF THE INVENTION

The present invention is directed to a method and system for manufacturing silicon nitride from waste silicon kerf.

In some exemplary implementations of the present invention, waste silicon kerf initially has agglomerations which are reduced in size. Calcium oxide is then added and mixed with the waste silicon kerf. This mixture is then placed in a ceramic crucible, which itself is placed in a furnace. The waste silicon kerf is then heat treated in the ceramic crucible in the furnace under a vacuum to disassociate silicon dioxide into silicon and silicon monoxide. The waste silicon kerf is then heat treated in the ceramic crucible in the furnace while nitrogen gas is introduced into the furnace to create the silicon nitride.

In some exemplary implementations, the waste silicon kerf is reduced to a size of 1-3 mm before heat treatment.

In some exemplary implementations, calcium oxide is added to the waste silicon kerf at a sufficient level to remove contaminants from the waste silicon kerf. In some particular implementations, the calcium oxide is added in an amount of 1%-4% by mass of the waste silicon kerf.

In some exemplary implementations, the waste silicon kerf is placed in the ceramic crucible to a thickness of less than or equal to approximately one-half inch.

In some exemplary implementations, the crucible includes a glaze made by coating the crucible with a mixture of pretreated calcium oxide, alumina powder, and fine sand and baking in air at 1600° C. In some particular implementations, the coating is made from a mixture of 38-47% calcium oxide, 13-17% alumina powder, and 38-47% fine sand.

In some exemplary implementations, the furnace is a vacuum furnace capable of maintaining vacuum levels of 100 microns or less.

In some exemplary implementations, the step of heat treating the waste silicon kerf in the ceramic crucible in the furnace under a vacuum includes heating and maintaining the furnace to 325° C. for 1-2 hours, pulling a vacuum in the furnace to less than 100 microns, heating the furnace to 1325° C. at a rate of approximately 4° C./min, and maintaining the furnace at 1325° C. for at least one hour.

In some exemplary implementations, the step of heat treating the waste silicon kerf in the ceramic crucible in the furnace under a vacuum includes heating the furnace to a first temperature, maintaining the first temperature for a first dwelling time period, pulling a vacuum in the furnace to less than 100 microns, heating the furnace to a second temperature greater than the first temperature, the temperature increasing over a first ramping time period, and maintaining the second temperature for a second dwelling time period. Furthermore, in some implementations, the step of heating the waste silicon kerf in the ceramic crucible in the furnace while introducing nitrogen gas into the furnace includes introducing the nitrogen gas, maintaining the second temperature for a third dwelling time period, heating the furnace to a third temperature greater than the second temperature, the temperature increasing over a second ramping time period, maintaining the third temperature for a fourth dwelling time period, and cooling the furnace.

In some particular implementations, the first temperature is 325° C. and the first dwelling time period is 1-2 hours.

In some particular implementations, the first temperature is maintained until the waste silicon kerf is dried, and carbon present in the waste silicon kerf is burned off or oxidized.

In some particular implementations, the first ramping time period is 250 minutes, and the second temperature is 1325° C.

In some particular implementations, the second dwelling time period is at least one hour.

In some particular implementations, the second dwelling time period is sufficient for silicon dioxide to disassociate into silicon and silicon monoxide.

In some particular implementations, the nitrogen gas is introduced to bring the furnace to a pressure of approximately 2 psig which is maintained until the furnace is cooled.

In some particular implementations, the third dwelling time period is at least one hour.

In some particular implementations, the second ramping time period is 130 minutes and the third temperature is 1390° C.

In some particular implementations, the fourth dwelling time period is 1-2 hours.

In some particular implementations, the fourth dwelling time period is sufficient to allow the nitrogen gas to diffuse into the waste silicon kerf, creating silicon nitride.

In some exemplary implementations, the waste silicon kerf contains 5-25% water, 10-25% silicon dioxide, and 1-4% carbon.

In some exemplary implementations, the waste silicon kerf further contains 200-1000 ppm iron.

In some exemplary implementations, the silicon nitride has more than 90% alpha-phase ($\alpha$-$Si_3N_4$) crystals.

Further features and advantages of the present invention will become evident to those of ordinary skill in the art after a study of the description, figures, and non-limiting examples in this document.

DESCRIPTION OF THE DRAWINGS

FIG. 1 is a flow chart illustrating the method steps involved in manufacturing silicon nitride from waste silicon kerf in one exemplary implementation of the present invention.

DESCRIPTION OF THE INVENTION

The present invention is a method and system for manufacturing silicon nitride from waste silicon kerf.

Waste silicon kerf in solution commonly has a mean particle size distribution of D50=1 micron (numbers base), but the kerf is often quite lumpy from agglomerations. The agglomerations should be reduced in size before further processing. Thus, a first step in manufacturing silicon nitride from waste silicon kerf is reducing the size of the agglomerations of the kerf, as indicated by block 102 in FIG. 1. Such size reduction is achieved via use of a mill or similar equipment. For example, one preferred mill for performing this step is a ball mill manufactured and distributed by Aaron Engineered Process Equipment, Inc. d/b/a Paul O. Abbe of Wood Dale, Illinois. Furthermore, in this step, proper dust control and inert gas purging is required to prevent dust exposure to employees and possible explosions from the silicon reacting with moisture in the kerf (which can create hydrogen). As a result of this milling, the kerf is essentially a powder with a size of 1-3 mm.

Referring still to FIG. 1, after milling, the next step in the process is adding and mixing calcium oxide (CaO) with the kerf, as indicated by block 104 in FIG. 1. In this regard, the kerf is preferably placed in mixing jars prior to the addition of the calcium oxide. The calcium oxide may be in either powder or pellet form. It is contemplated that 0.5-2.0 grams of calcium oxide would be added to 50 grams of kerf (i.e., calcium oxide is added to the kerf at approximately 1%-4% by mass). The precise amount of calcium may be dependent, at least in part, on the contamination levels in the kerf.

Furthermore, prior to the addition of the calcium oxide to the kerf, it is preferred that the calcium oxide is pretreated in a furnace at 1300° C. to 1400° C. for a period of four hours. Calcium oxide (CaO) will form calcium carbonate ($CaCO_3$) if left exposed to air. Through the pretreatment, carbon dioxide ($CO_2$) is driven off to reestablish the purity of the calcium oxide (CaO).

After adding calcium oxide to the kerf, desired mixing is achieved, for example, by tumbling the materials together for a time of 30 minutes or more, depending on quantity and speed, preferably with glass marbles to aid in mixing.

Referring again to FIG. 1, the next step is to the place the kerf (mixed with the calcium oxide) in ceramic crucibles, as indicated by block 106 in FIG. 1. Based on experimentation, and for quality control reasons, it has been determined that the kerf in each ceramic crucible should have a depth of less than or equal to approximately one-half inch.

With respect to the construction of the crucibles, the crucibles must be compatible with silicon, must not contaminate the silicon with impurities, and must be suitable for temperatures up to 1600° C., as described below. The size, shape, and weight of the crucibles can vary according to the furnace size and dimensions. For example, one exemplary crucible has dimensions of approximately 8"×8" with a resulting volume of approximately 38 in³ to allow for a fill depth of approximately one-half inch, while another exemplary crucible has dimensions of approximately 14"×14" with a resulting volume of approximately 145 in³ to allow for a fill depth of approximately one-half inch.

Furthermore, each crucible is preferably coated with a mix made of pretreated calcium oxide, alumina powder, and fine sand that is baked in air at 1600° C., which results in a glaze that assists with the nitriding process and reduces any residual contamination from the crucible, as also described below. Crucibles are porous, and the glaze seals the pores to prevent impurities in the crucible from interfering with the nitriding process. At the same time, the glaze prevents the crucible from becoming contaminated with impurities in the kerf which could pass into future kerf runs. For example, one preferred mix includes 38-47% calcium oxide, 13-17% alumina powder, and 38-47% fine sand. As used herein, "fine sand" is any sand having a grain size of less than or equal to approximately 0.25 mm. It is also preferable to periodically re-glaze the crucibles.

Referring again to FIG. 1, the next step is to the place the crucibles and the kerf (mixed with the calcium oxide) into a vacuum furnace for heat treatment, as indicated by block 108 in FIG. 1. With respect to the design of such a vacuum furnace, during the heating process (as further described below), the temperature variation across the hot zone of the furnace should be less than 3° C. Heating elements in the furnace should be compatible with air, nitrogen, and silicon at temperatures between 0° C. and 1600° C. The furnace controls should be programmable to allow several dwell times at different temperatures and pressures, as further described below. The vacuum system should be capable of maintaining a vacuum level of 100 microns or less for extended periods of time. The vacuum system should also be capable of handling water vapor, organic vapor, and potential silicon monoxide (SiO) gas as the heating process progresses. For example, one preferred vacuum for performing the desired heat treatment is a Stokes Microvac rotary piston pump manufactured and distributed by Edwards Limited d/b/a Edwards Vacuum of West Sussex, Burgess Hill, United Kingdom.

Referring again to FIG. 1, the next step is to subject the crucibles and the kerf (mixed with the calcium oxide) in the vacuum furnace to heat treatment, as indicated by block 110 in FIG. 1. Such heat treatment includes multiple heating ramps, separated by predetermined dwell times under different vacuum pressures.

For instance, for kerf that contains approximately 15% water, 10% silicone dioxide ($SiO_2$), and 2% carbon, an exemplary heat treatment comprises the following steps:

1. Once the crucibles are placed in the vacuum furnace, the furnace is heated to 325° C.
2. The furnace is maintained and dwells at this temperature for 1-2 hours. During this dwell period, the kerf is dried, and carbon present in the kerf is burned off or oxidized. This step does not remove carbon contributed by the diamond contamination, but this represents a trace amount of remaining carbon which does not affect the subsequent heat treatment.
3. After this dwell period, the furnace is pulled under a vacuum to less than 100 microns.
4. The temperature is then increased to 1325° C. over a time period of approximately 250 minutes (i.e., the heat is ramped at approximately 4° C./min over the time period).
5. The furnace is maintained and dwells at this temperature for at least one hour. During this dwell period, silicon dioxide ($SiO_2$) is disassociated into silicon (Si) and silicon monoxide (SiO). In some exemplary implementations, nearly all (e.g., >99%) of the $SiO_2$ is disassociated into Si and SiO.

6. After this dwell period, the vacuum is turned off. Highly purified and dry nitrogen gas is introduced into the furnace at a pressure of approximately 2 psig, and nitrogen gas flow is maintained though the subsequent steps described below.

7. The furnace is maintained and dwells at the same temperature for at least one hour.

8 The temperature is then slowly increased to 1390° C. over a time period of approximately 130 minutes (i.e., the heat is ramped at approximately 0.5° C./min over the time period).

9. The furnace is maintained and dwells at this temperature for another for 1-2 hours. During this dwell period, nitriding occurs with the nitrogen gas diffusing into the silicon kerf, creating silicon nitride.

10. After this dwell period, the furnace is allowed to cool (e.g., to 200° C.) under nitrogen until the furnace can be safely opened. The nitrogen flow is turned off when the furnace is opened, and then, the crucibles can be removed.

The times and temperatures for the above exemplary heat treatment, provided as either single values or ranges, are all approximate and therefore encompass ranges outside of those specifically recited as would be readily understood by one skilled in the art.

As noted above, the above-described heat treatment is particularly applicable to manufacturing silicon nitride from kerf that contains approximately 15% water, 10% silicone dioxide ($SiO_2$), and 2% carbon, but similar heat treatments are applicable for kerf that contains 5-25% water, 10-25% silicon dioxide, 1-4% carbon, and 200-1000 ppm iron. The heating ramps, dwell times, and pressures are modified and adapted as necessary for kerf with different properties. For example, if the kerf has a higher (or lower) water content, calcium oxide content or dwell times could be different. For another example, if the kerf has a higher (or lower) silicon dioxide contamination, calcium oxide content or dwell times could be different. Typically, each source of waste silicon kerf has substantially similar properties from batch to batch, and therefore the same, or substantially similar, heat treatment can be applied to all batches of waste silicon kerf from a given source. It is contemplated that a database of kerf source properties could be maintained and utilized to determine which heat treatment is best suited for a given batch of waste silicon kerf.

Referring again to FIG. 1, after subjecting kerf to heat treatment, the powder in the crucibles has been transformed into a high-quality silicon nitride ($Si_3N_4$) powder, changing in color from dark grey to off-white. More importantly, the silicon nitride powder is of a high quality, having more ninety percent (90%) alpha-phase ($\alpha$-$Si_3N_4$) crystals. Indeed, in a typical batch of silicon nitride powder manufactured as described above, half includes more than ninety percent (90%) alpha-phase crystals, and half includes more than ninety-five percent (95%) alpha-phase crystals.

In some implementations, it is desirable to perform a few subsequent processing steps after heat treatment, for example, to reduce calcium levels in the silicon nitride powder below 1000 ppm and/or reduce the particle size to D50<0.8 micron (number base).

In some implementations and referring again to FIG. 1, the silicon nitride powder is milled in a planetary or an attrition mill using high-quality, reaction-bonded silicon nitride media, as indicated by block 112 in FIG. 1. The silicon nitride powder is preferably milled in one hundred percent (100%) ethanol that is low in free oxygen for up to twelve hours, which results in an ethanol/silicon nitride slurry with a specific surface area (SSA) greater than 10 $m^2/g$.

After milling, the ethanol/silicon nitride slurry is filtered and then dried to create a silicon nitride paste, as indicated by block 114 in FIG. 1. Specifically, the slurry is mixed with water, and the pH level is adjusted to less than 6.0. The mixture is then agitated for several hours to reduce calcium, which has become soluble at the lower pH level. The mixture is then dewatered to create the silicon nitride paste, for example, by using a decanter centrifuge or plate-and-frame filter press. The silicon nitride paste is then placed in a low-temperature vacuum drying oven for drying. Once dried, the silicon nitride resultant powder can be lightly milled to break up agglomerations before prior to packaging.

One of ordinary skill in the art will recognize that additional implementations are also possible without departing from the teachings of the present invention. This detailed description, and particularly the specific details of the exemplary implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for manufacturing silicon nitride from waste silicon kerf, comprising the steps of:
   reducing agglomerations in the waste silicon kerf;
   adding and mixing calcium oxide to the waste silicon kerf;
   placing the waste silicon kerf in a ceramic crucible;
   placing the ceramic crucible in a furnace;
   heat treating the waste silicon kerf in the ceramic crucible in the furnace under a vacuum to disassociate silicon dioxide into silicon and silicon monoxide; and
   heat treating the waste silicon kerf in the ceramic crucible in the furnace while introducing nitrogen gas into the furnace to create the silicon nitride;
   wherein the step of heat treating the waste silicon kerf in the ceramic crucible in the furnace under a vacuum includes
      heating the furnace to a first temperature,
      maintaining the first temperature for a first dwelling time period,
      pulling a vacuum in the furnace to less than 100 microns,
      heating the furnace to a second temperature greater than the first temperature, the temperature increasing over a first ramping time period, and
      maintaining the second temperature for a second dwelling time period; and
   wherein the step of heating the waste silicon kerf in the ceramic crucible in the furnace while introducing nitrogen gas into the furnace includes:
      introducing the nitrogen gas,
      maintaining the second temperature for a third dwelling time period,
      heating the furnace to a third temperature greater than the second temperature, the temperature increasing over a second ramping time period,
      maintaining the third temperature for a fourth dwelling time period, and cooling the furnace.

2. The method of claim 1, wherein the first temperature is 325° C., and wherein the first dwelling time period is 1-2 hours.

3. The method of claim 1, wherein the first temperature is maintained until the waste silicon kerf is dried and carbon present in the waste silicon kerf is burned off or oxidized.

4. The method of claim 1, wherein the first ramping time period is 250 minutes and the second temperature is 1325° C.

5. The method of claim 1, wherein the second dwelling time period is at least one hour.

6. The method of claim 1, wherein the second dwelling time period is sufficient for silicon dioxide to disassociate into silicon and silicon monoxide.

7. The method of claim 1, wherein the nitrogen gas is introduced to bring the furnace to a pressure of approximately 2 psig which is maintained until the furnace is cooled.

8. The method of claim 1, wherein the third dwelling time period is at least one hour.

9. The method of claim 1, wherein the second ramping time period is 130 minutes and the third temperature is 1390° C.

10. The method of claim 1, wherein the fourth dwelling time period is 1-2 hours.

11. The method of claim 1, wherein the fourth dwelling time period is sufficient to allow the nitrogen gas to diffuse into the waste silicon kerf, creating silicon nitride.

12. A method for manufacturing silicon nitride from waste silicon kerf, comprising the steps of:

reducing agglomerations in the waste silicon kerf;

adding and mixing calcium oxide to the waste silicon kerf;

placing the waste silicon kerf in a ceramic crucible;

placing the ceramic crucible in a furnace;

heat treating the waste silicon kerf in the ceramic crucible in the furnace under a vacuum to disassociate silicon dioxide into silicon and silicon monoxide; and heat treating the waste silicon kerf in the ceramic crucible in the furnace while introducing nitrogen gas into the furnace to create the silicon nitride, wherein the waste silicon kerf contains 5-25% water, 10-25% silicon dioxide, and 1-4% carbon.

13. The method of 12, wherein the waste silicon kerf further contains 200-1000 ppm iron.

14. The method of claim 12, wherein the silicon nitride has more than 90% alpha-phase ($\alpha$-$Si_3N_4$) crystals.

15. The method of claim 12, wherein the waste silicon kerf is reduced to a size of 1-3 mm.

16. The method of claim 12, wherein the calcium oxide is added in an amount of 1%-4% by mass of the waste silicon kerf.

17. The method of claim 12, wherein the waste silicon kerf is placed in the ceramic crucible to a thickness of less than or equal to approximately one-half inch.

18. The method of claim 12, wherein the crucible includes a glaze made by coating the crucible with a mixture of pretreated calcium oxide, alumina powder, and fine sand and baking in air at 1600° C.

19. The method of claim 18, wherein the coating is made from a mixture of 38-47% calcium oxide, 13-17% alumina powder, and 38-47% fine sand.

20. The method of claim 12, wherein the furnace is a vacuum furnace capable of maintaining vacuum levels of 100 microns or less.

21. The method of claim 20, wherein the step of heat treating the waste silicon kerf in the ceramic crucible in the furnace under a vacuum includes:

heating and maintaining the furnace to 325° C. for 1-2 hours, pulling a vacuum in the furnace to less than 100 microns, heating the furnace to 1325° C. at a rate of approximately 4° C./min, and maintaining the furnace at 1325° C. for at least one hour.

22. A method for manufacturing silicon nitride from waste silicon kerf, comprising the steps of:

placing the waste silicon kerf in a ceramic crucible;

placing the ceramic crucible in a furnace;

heating the furnace to a first temperature;

maintaining the first temperature for a first dwelling time period;

pulling a vacuum in the furnace to less than 100 microns;

heating the furnace to a second temperature greater than the first temperature, the temperature increasing over a first ramping time period;

maintaining the second temperature for a second dwelling time period;

introducing nitrogen gas to the furnace;

maintaining the second temperature for a third dwelling time period; and heat treating the waste silicon kerf to create the silicon nitride.

23. A method for manufacturing silicon nitride from waste silicon kerf, comprising the steps of:

placing the waste silicon kerf in a ceramic crucible;

placing the ceramic crucible in a furnace;

heating and maintaining the furnace to 325° C. for 1-2 hours;

pulling a vacuum in the furnace to less than 100 microns;

heating the furnace to 1325° C. at a rate of approximately 4° C./min;

maintaining the furnace at 1325° C. for at least one hour;

introducing nitrogen gas to bring the furnace to a pressure of approximately 2 psig;

maintaining the furnace at 1325° C. for at least one hour; and heat treating the waste silicon kerf to create the silicon nitride.

* * * * *